United States Patent [19]
Grimm

[11] Patent Number: 5,840,147
[45] Date of Patent: Nov. 24, 1998

[54] PLASTIC JOINING METHOD

[75] Inventor: Robert A. Grimm, Columbus, Ohio

[73] Assignee: Edison Welding Institute, Columbus, Ohio

[21] Appl. No.: 478,505

[22] Filed: Jun. 7, 1995

[51] Int. Cl.⁶ .................................................. B32B 31/00
[52] U.S. Cl. .................................. 156/272.2; 156/273.3; 156/275.1; 156/275.7
[58] Field of Search .......................... 156/73.1, 272.2, 156/273.2, 273.5, 282, 580, 498, 275.1, 275.7; 219/411; 250/504 R

[56] References Cited

U.S. PATENT DOCUMENTS

| | | | |
|---|---|---|---|
| 3,247,041 | 4/1966 | Henderson | 156/272.2 X |
| 3,560,291 | 2/1971 | Foglia | 156/229 |
| 3,804,691 | 4/1974 | Trivedi | 156/272.2 X |
| 3,956,053 | 5/1976 | Staats | 156/272.2 |
| 4,419,304 | 12/1983 | Ficke et al. | 264/25 |
| 4,424,435 | 1/1984 | Barnes, Jr. | 219/121 |
| 4,636,609 | 1/1987 | Nakamata | 219/121 LD |
| 4,969,969 | 11/1990 | Powers | 156/275.1 |
| 5,151,149 | 9/1992 | Swartz | 156/78.8 |
| 5,286,327 | 2/1994 | Swartz | 156/273.3 |
| 5,313,034 | 5/1994 | Grimm et al. | 219/765 |
| 5,348,604 | 9/1994 | Neff | 156/272.8 |
| 5,522,954 | 6/1996 | Bennett et al. | 156/64 |

FOREIGN PATENT DOCUMENTS

| | | |
|---|---|---|
| 1506163 | 12/1966 | France . |
| 6510316 | 2/1967 | Netherlands . |
| WO 94/22661 | 10/1994 | WIPO ............ B29C 63/10 |

OTHER PUBLICATIONS

Ou, B.S., et al. "Laser Welding of Polyethylene and Polypropylene Plates." *ANTEC '92*, pp. 1764–1767.

*Primary Examiner*—Krisanne Thornton
*Attorney, Agent, or Firm*—Philip J. Pollick

[57] ABSTRACT

A plastic joining method directs polychromate, non-coherent electromagnetic radiation through a transmitting plastic to an absorbing material that absorbs the radiation with the generation of heat. The heat is used to heat a bond line formed from the transmitting plastic and a substrate sufficiently to bond the transmitting plastic and substrate. A radiation filter of the same material as the transmitting plastic is used to reduce effectively unwanted absorption (and heat) in the transmitting plastic. Radiation focusing, masking, transmitting plastic cooling, bond line component drying, double pass welding, and additional bond line pressure are used to improve the bond of the resulting manufacture.

20 Claims, 4 Drawing Sheets

PLASTIC JOINING METHOD

BACKGROUND OF THE INVENTION

1. Field of the Invention

This invention relates to a method for bonding plastic materials. More particularly, it relates to the bonding of plastic materials by passing polychromatic, non-coherent, electromagnetic radiation through the material and into a second material that absorbs the radiation with the generation of heat and formation of a bond or weld.

2. Background

Although one piece items are preferred because of their strength and exclusion of assembly operations, mechanical limitations and other considerations often make it necessary to join plastic materials to each other or to other parts. As a consequence, a number of methods for joining plastic materials have been developed. Probably, the simplest of these methods is the use of mechanical fasteners such as screws or bolts, nuts and washers. In addition to the fact that the use of such fasteners is labor intensive, fastening techniques tend to be unsatisfactory as the integrity of the plastic is corrupted by the hole necessary for use with the fasteners, such mechanical joints often leak, and the fasteners can cause weakness of the joint. Press and snap fits are also used as a mechanical method of joining plastic. For many applications this also tends to be unsatisfactory since the method involves high stress components which may be unacceptable when the materials are subject to thermal cycling or to harsh environments.

Ultrasonic welding makes use of ultrasonic vibrations that generate frictional heat that melts the plastics and allows them to join. However the method is limited to small parts with simple geometries and vibration of composite materials may cause the composite fibers to abrade and dislocate. In heat welding, a heated platen, typically coated with polytetrafluoroethylene, is placed between the two parts to be joined. The parts are brought in contact with the heated platen until the joint is melted after which the platen is retracted and the pieces brought together and held in place with slight pressure until the bond is formed. A tendency for some plastics to stick to the platen causes the polymer to string out like taffy and may result in part rejection if such strings mar the plastic surface. Electromagnetic welding uses microsize ferromagnetic particles that are dispersed within the thermoplastic matrix. Exposure to a high frequency alternating current source causes the ferromagnetic particles to respond and melt the surrounding plastic material. In vibration welding, one of the parts is held stationary and the other is vibrated through a small displacement to produce frictional heat. When a molten state is reached at the joint interface, the vibration is stopped, the parts aligned and pressure applied. Alignment is critical and bonds may not be as strong as expected. For circular plastics, spin or friction welding may be employed. One part is held stationary while the other is rotated under sufficient pressure to keep the parts in contact with each other. The heat generated by the friction melts the surface at which point the rotation is stopped and pressure applied to complete the bonding process.

Solvents and adhesives have also been used to join thermoplastic materials. For plastic materials that are soluble in the same solvent, the bond area is treated with solvent to soften the surfaces after which the parts are clamped together until bonding occurs. Because solvents can adversely effect some plastics, it may not be an attractive form of bonding. Also, solvents present potential hazards to assembly personnel. Plastics can also be bonded with a variety of adhesives but these can also be troublesome in view of the fact that some adhesives are solvent based and present the solvent problems noted above. Both solvent and adhesive methods are complicated by waste and chemical disposal problems in addition to surface preparation requirements. In addition, adhesives can complicate polymer recycling.

Grimm et al., U.S. Pat. No. 5,313,034, sets forth a number of welding techniques involving resistance and magnetic susceptor welding. Long, continuous thermoplastic welds can be obtained on large structures by using a series of tabs in conjunction with a resistance heating strip placed within the bond line. Metallic or non-metallic resistance elements may be used to heat the bond line. For curved bond lines, a flexible resistance element braid tube can be used. Grimm et al. have also developed susceptor welding concepts that take advantage of induction heating while avoiding bulk heating of the substrate. Braid-tube susceptors have been found to be especially advantageous when used with induction heating as heating takes place at the center rather than at the edges of the susceptor.

Swartz, U.S. Pat. No. 5,151,149 and U.S. Pat. No. 5,286,327, has developed a method using infrared lamps for the bonding of plastic materials. In this method, the surfaces to be bonded are separated and each of the surfaces simultaneously heated with reciprocating infrared lamps. On melting of the plastic surfaces, the infrared lamps are removed and the two surfaces pressed together to form a bond.

Foglia et al., U.S. Pat. No. 3,560,291, has developed a method of bonding thermoplastic resin films using a focused laser beam. An unfocused laser beam was used in conjunction with a stretched film to take advantage of the interaction of the plane, polarized light from the laser source to effect heating and bonding of the films.

Nakanata, U.S. Pat. No. 4,636,609, used a laser source to bond a laser transparent plastic to a laser energy absorbing plastic by directing the laser beam through the transmitting plastic to the interface of the absorbing plastic to heat the surface of the absorbing plastic and cause it to bond to the first plastic. However, laser welding has been found to be problematic. Bond strengths can be disappointing. Vaporization and flashing (ignition) of substrate can occur when gaps occur between the interface of the two materials. Laser welding also tends to create pits and craters on the surface of the transparent material. Although lasers have been on the market for a considerable time, their cost is still relatively high in comparison to polychromatic, non-coherent energy sources such as incandescent heat lamps.

It is an object of the present invention to provide a low-cost alternative to the laser welding of transparent and radiation absorbing materials.

It is another object of the present invention to avoid the insertion of conductive strips or ferromagnetic materials into the bond line.

It is an object of the present invention to avoid the stringy plastic residue encountered in some forms of frictional bonding.

It is an object of the present invention to use a readily available and low cost energy source.

It is an object of the present invention to avoid surface pitting and marring of the materials to be bonded.

It is a further object of the present invention to avoid vaporization and flashing (ignition) within the bond line.

It is an object of the present invention to heat only those portions of the plastic and substrate involved in bonding while leaving other portions of the materials forming the bond line essentially unaffected.

It is a further object of the present invention to avoid the use of solvents and other environmentally unfriendly bonding adhesives.

It is an object of the present invention to provide a static welding method in which neither the energy source nor bond line is moved during a welding process and in which the entire bond line is simultaneously immersed in electromagnetic radiation.

It is an object of the present invention to provide a uniform and strong bond along the bond line.

Other objects of the invention will become apparent to those with ordinary skill in the art from consideration of the present disclosure.

SUMMARY OF THE INVENTION

To meet these objects, a plastic joining method of the present invention features the use of polychromatic, non-coherent electromagnetic radiation from a radiation source such as an infrared lamp. The use of infrared lamp has the distinct advantage of lowering radiation source costs significantly in comparison with laser radiation sources used in the prior art and avoids the vaporization, surface marring, and flashing (ignition) associated with laser welding.

This radiation is directed through a transmitting plastic and then to an absorbing material that absorbs the radiation with the generation of heat. The absorbing material is placed in a bond line in proximity with the transmitting plastic, a substrate and an optional bonding material so that the generated heat is sufficient to bond the transmitting plastic and substrate on cooling.

The feature of positioning the transmitting plastic in proximity with the substrate has the advantageous of avoiding alignment problems, "taffy strings" and poor bonds associated with frictional and heated-tool welding methods.

Another feature of the present invention is the use of filters and especially the use of a radiation filter consisting of a plastic having the same chemical composition as the transmitting plastic. This has the advantage of avoiding costly commercial filters and, more importantly, exactly matches the absorbing characteristics of the transmitting plastic to filter effectively only that radiation likely to cause unwanted heating of the transmitting plastic.

This invention also features the use of various patterns of focused beams of radiation such as point, spot, line and strip patterns. This has the advantage of effectively concentrating the radiation at the bond line of a wide variety of weld types and allowing for both moving and static welding operations. Radiation masking can also be used to control the radiation pattern, especially when heat sensitive materials or configurations occur on portions of the substrate.

To reduce the formation of bubbles when certain transmitting plastics or substrates are used, this invention features component drying, preheating (double-pass welding) and increased bond line pressure application to improve the bond of the resulting manufacture.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of components may appear to those skilled in the art without departing from the scope of or sacrificing any of the advantages of the invention.

Figure 1:
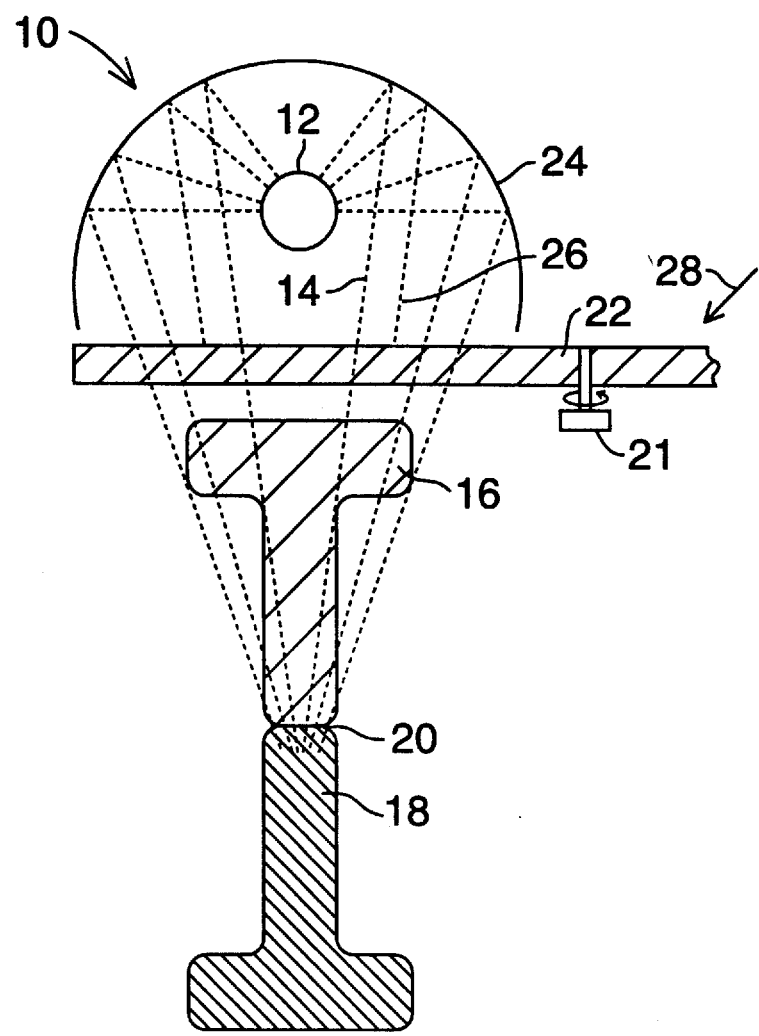
FIG. 1 is a cross-section view of a preferred method and apparatus according to the present invention for joining plastic by transmitting focused polychromatic, non-coherent electromagnetic radiation through a transmitting plastic and into a substrate containing absorbing material with the generation of heat sufficient to bond said transmitting plastic to said substrate.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

With reference to the drawings and initially FIG. 1, a preferred embodiment of the present invention generally referred to by the numeral 10 comprises a radiation source 12 that generates polychromatic, non-coherent electromagnetic radiation 14, a transmitting plastic 16 that transmits radiation 14, and a substrate 18 that contains an absorbing material that absorbs radiation 14 with the generation of heat. A bond line 20 is formed by placing the substrate containing absorbing material 18 in proximity with transmitting plastic 16 and then passing radiation 14 from radiation source 12 through transmitting plastic 16 to the absorbing material in substrate 18. Sufficient radiation 14 is absorbed by the absorbing material in substrate 18 to produce sufficient heat in bond line 20 to afford bonding of transmitting plastic 16 to substrate 18 on cooling of bond line 20.

Figure 3:
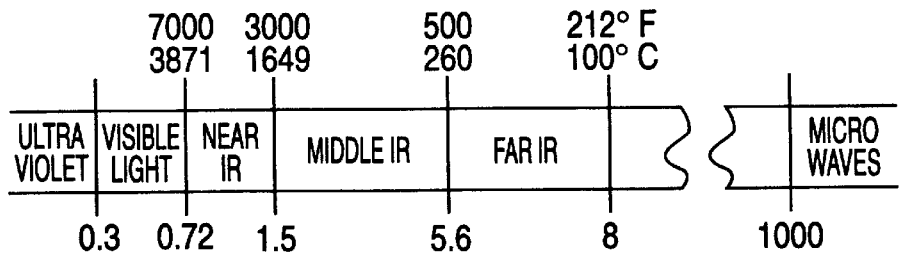
FIG. 3 is a schematic diagram showing the temperature of peak radiated energy from various parts of the electromagnetic radiation spectrum.
Figure 4:
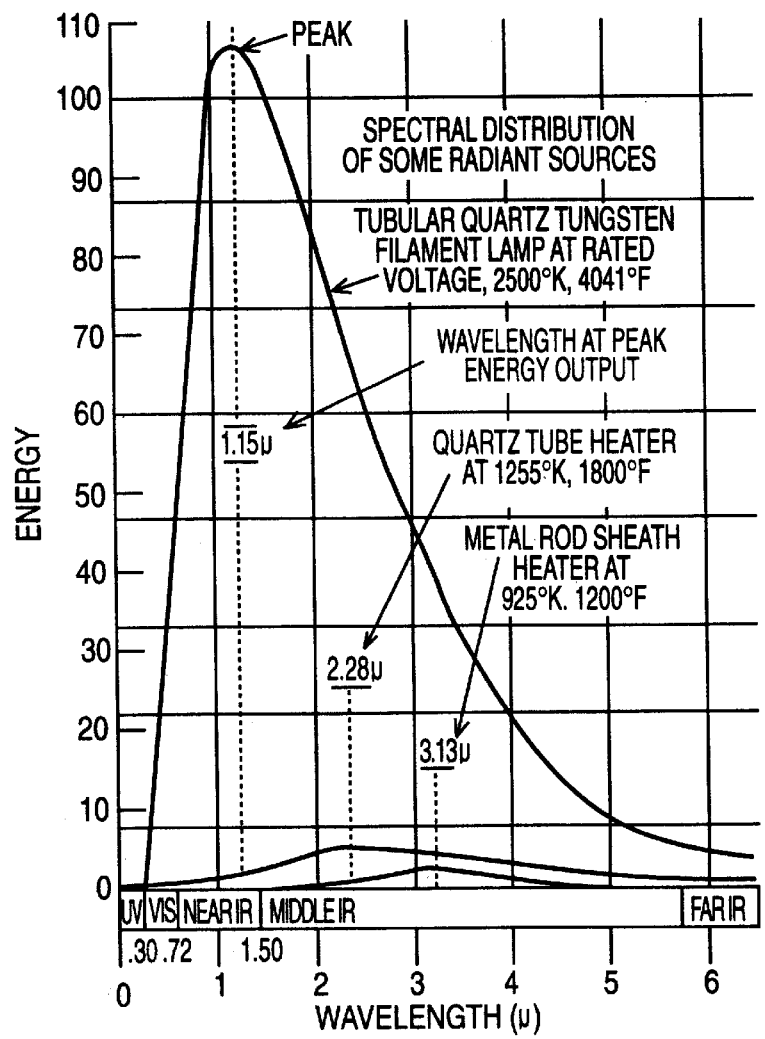
FIG. 4 is a graph of energy (vertical axis) versus wavelength in microns (horizontal axis) for various electromagnetic radiation sources.

Radiant energy, in the form of polychromatic, non-coherent electromagnetic radiation is provided from an incandescent or similar radiation source. Radiant energies for the purposes of this invention range from the ultraviolet to the far infrared, typically about 0.25 microns ($\mu$) to about 8 microns (FIG. 3). Preferably an energy source in the range of $0.5\mu$ to $2.8\mu$ is used with a radiation source providing peak near-infrared energy in the range of about $0.7\mu$ to about $1.5\mu$ being most preferred (FIG. 4) for many applications.

Figure 5:
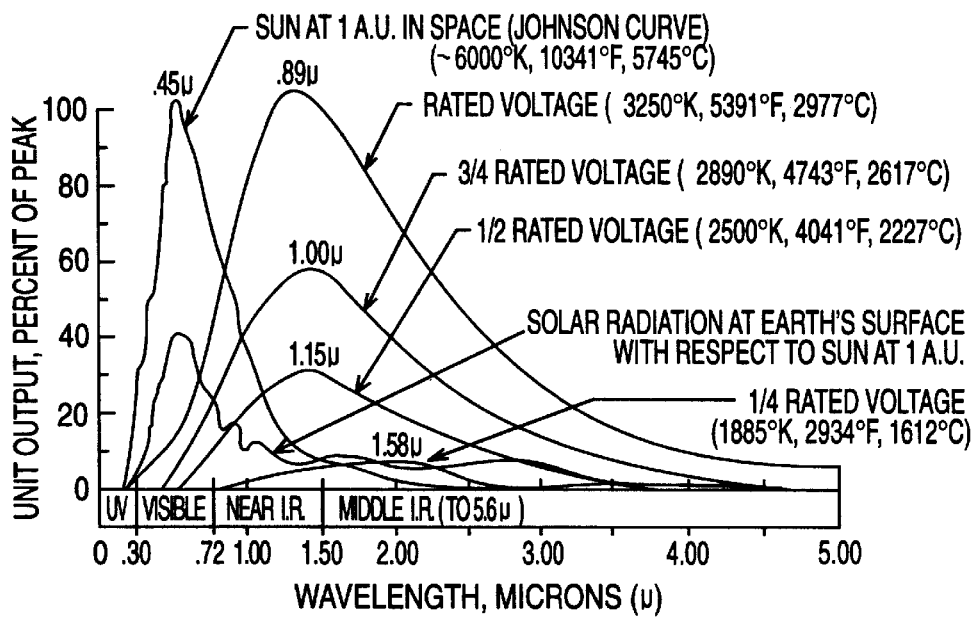
FIG. 5 is a graph of radiation output in arbitrary units (A.U.) (vertical axis) versus wavelength in microns (horizontal axis) for a quartz-halogen lamp operating at various output voltages. For comparison purposes, the radiation output of the sun is shown in space and at the earth's surface.

Infrared radiation from filament sources produces a distribution of wavelengths with the wavelength of maximum emission being a direct function of source temperature (FIG. 5). Wien's Law, i.e., $\lambda_{max}(\mu)=2989\mu$ °K./T(°K.), governs such behavior. Thus an incandescent source operating at 3000° C. (3273° K.) shows maximum output at a wavelength of $0.89\mu$.

Figure 2:
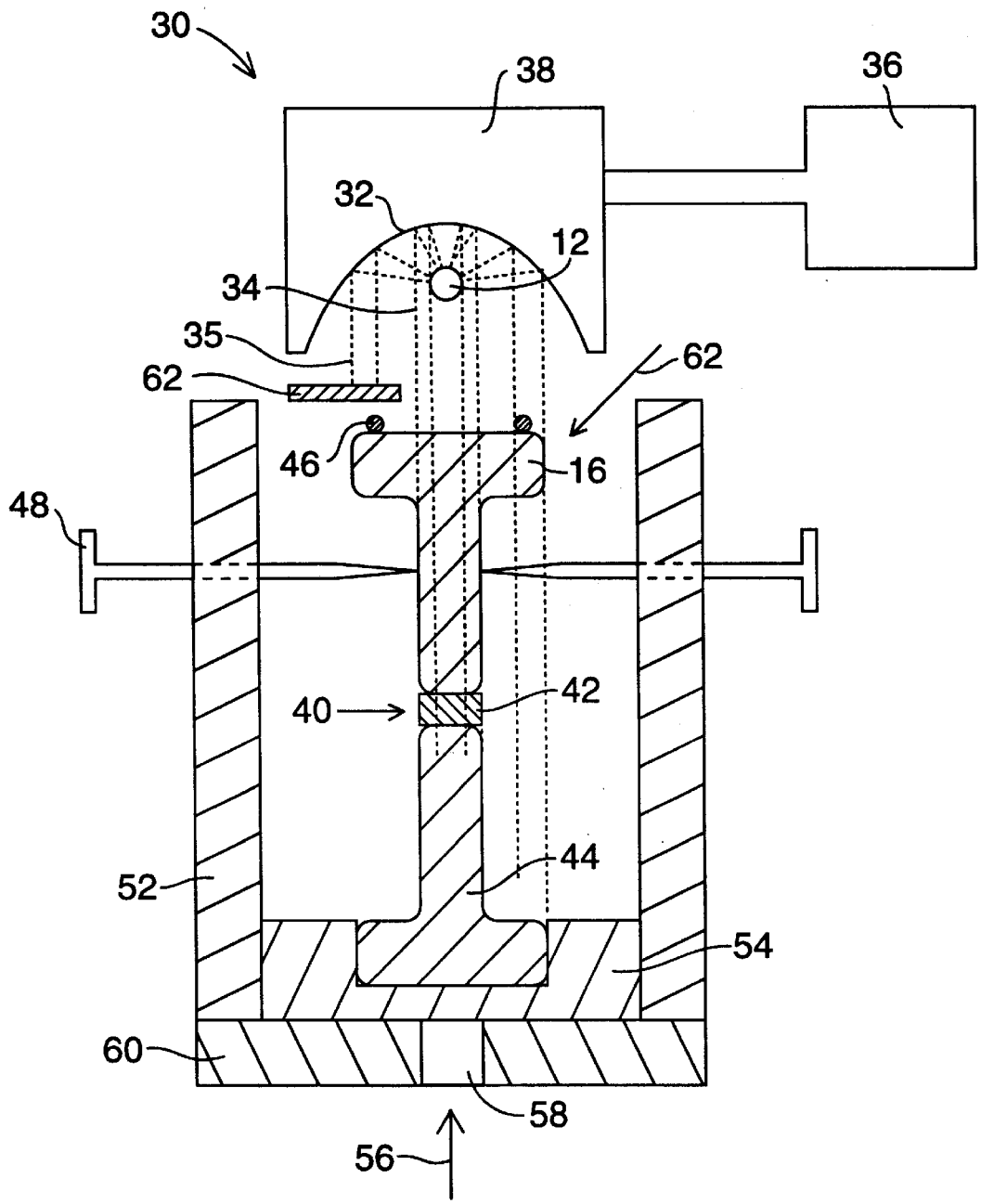
FIG. 2 is a cross-section view of another method and apparatus according to the present invention for joining plastic similar to FIG. 1 but using parallel electromagnetic radiation and a separate absorbing material and substrate along with a robotic device for moving the radiation source and a clamping device for applying pressure to the bond line.

A wide variety of radiation sources may be used with this invention including infrared lamps such as quartz-halogen and quartz-tungsten lamps. Such sources may be configured in a variety of ways to provide a number of radiation patterns. In FIG. 1, an elliptical reflector 24 is used in conjunction with radiation source 12 to provide a focused beam of radiation 14. In FIG. 2, a parabolic reflector 32 is used to give a parallel beam of radiation 34. In addition, other geometric beam shapes are contemplated for use with this invention such as those afforded by line and strip heaters. A line heater can be visualized by extending source 12 and reflector 24 (FIG. 1) into and out of the page to form a line of focused radiation rather than a spot of focused radiation. Similarly, a strip heater is formed by extending source 12 and reflector 32 (FIG. 2) in and out of the page to form a strip of radiation.

A focused spot of radiation is especially useful when forming a narrow bond line and is used typically by moving either the radiation source while holding the bond line fixed or moving the bond line while holding the radiation source fixed. A parallel beam as shown in FIG. 2 is preferred for wider bond lines as encountered with lap joints. Here, as with focused radiation, either the radiation source is moved with respect to a stationary bond line or the bond line is moved with respect to a stationary source. For simple linear bonds, either the bond line or the radiation source can be moved with an electrically driven screw (not shown). Varying speeds can be obtained by varying the voltage applied to the motor that drives the screw. As seen in FIG. 2, a robot 36 (shown schematically) can be used to move the radiation source 12 and associated reflector 32 and housing 38 with respect to the bond line. This can be very effective for parts having tortuous and complex bond lines. In addition, multiple lamps can be used to increase the radiation delivery to a particular point or to increase the welding area.

It is also noted that line and strip heaters can be used to weld small bond lines (joints) without movement of either the lamp or bond line. In such instances the radiation beam is sized and shaped to conform to the entire bond line so that radiation is absorbed simultaneously by the absorbing material at all points in the bond line. This invention also contemplates the use of complex specific beam shapes and patterns, use of multiple lamps, or both to weld large and complex bond lines in a static welding mode, i.e., without movement of the bond line or radiation source with respect to the other but rather by immersing the entire bond line in radiation so that all points in the bond line are heated simultaneously.

In order to heat the bond line, a radiation absorbing material is used to absorb the radiation from the radiation source. A wide variety of radiation absorbing materials are contemplated by the present invention including inorganic materials such as, but not limited to, pigments, fillers, fibers and reinforcing materials. Carbon blacks have been found to be a particularly good absorber for electromagnetic radiation with amounts of less than 1% being effective for the present invention. As shown in FIGS. 1 and 2, either the absorber is placed into the bond line 40 as a separate component 42 (FIG. 2) or, it is mixed and formed as part of substrate 18 as shown in FIG. 1. When, as shown in FIG. 2, it is used as a separate component in the bond line 40, it must be sufficiently thin (less than a few millimeters) to assure bonding of both the substrate 44 and transmitting plastic 16. When used as a separate component, the absorber may be mixed with a suitable bonding material that facilitates and promotes the bonding of transmitting plastic 16 to substrate 44. For effective bonding, it is essential that the source radiation absorbing material be in proximity with the transmitting plastic, the substrate, and any optional bonding material. As used here, the term "proximity" is used to mean "close to" or "in contact with."

The present invention contemplates a wide range of transmitting plastics including both thermosets and thermoplastics. Such transmitting plastics include, but are not limited to, acrylics, ultraviolet (UV) grade acrylics, polystyrenes (PS), polycarbonates (PC), methylmethacrylates, styrene-acrylonitriles, polyolefins, nylons, fluoropolymers, methylpentenes, epoxies, silicones, and urethanes. Such plastics may be clear or colored, e.g., red, amber, etc. However the coloring pigments must not absorb appreciable quantities of the polychromatic radiation used for joining.

Figure 6:
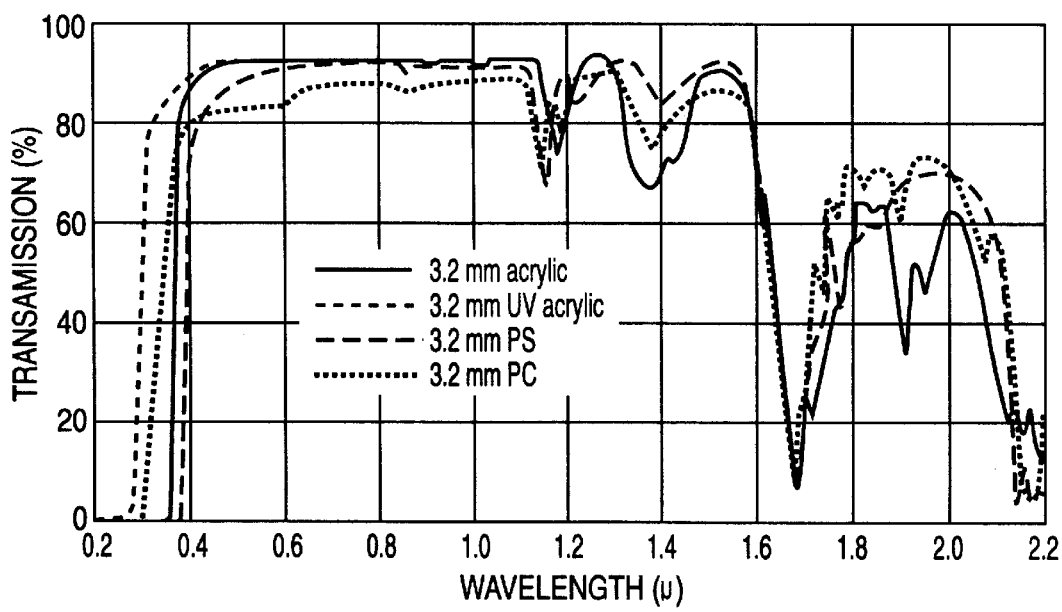
FIG. 6 shows electromagnetic radiation transmission on the vertical axis in percentage and the wave length in microns on the horizontal axis for a number of transmitting plastics including acrylic, ultraviolet (UV) acrylic, polystyrene (PS) and polycarbonate (PC).

FIG. 6 illustrates the radiation transmission characteristics of some preferred plastics for use this invention including acrylics, polystyrenes (PS), and polycarbonates (PC). As is apparent, these plastics afford high radiation transmission in the visible and near infrared region. Preferably the radiation source and transmitting plastic are selected to maximize the transmission of source radiation through the transmitting plastic.

In some instances, it may not be possible to match perfectly the radiation source and the transmission profile of the plastic and thus warming of the transmitting plastic may be experienced as a result of absorption of a portion of the source radiation. Since undesirable transmitting plastic heating occurs largely at the surface of the plastic, one way of controlling this heating effect is to direct a gentle stream of air 62 over the surface of the transmitting plastic 16 (FIG. 2). This is especially effective when sufficient quantities of absorbing material such as carbon black are provided in the bond line so as to achieve rapid bond line heating without undue radiation transmission and absorption heating of the transmitting plastic.

For less effective absorbing materials, e.g., when substrate 18 is a gray rather than black plastic or when the radiation distribution of the source overlaps considerably with the absorbing wave lengths of the transmitting plastic, it has been found particularly effective to remove absorbing radiation wavelengths by the use of a filter 22 (FIG. 1).

As background, it is noted that appropriate plastics such as those shown in FIG. 6 exhibit little absorption in the near infrared region, i.e., about 0.7 to about $1.5\mu$. Such absorption, when present, is typically due to overtones of primary absorption bands and tends to be of little consequence with respect to heat generation as a result of radiation absorption. However absorption above about 3μ and especially above about 5μ can be considerable. A quartz-tungsten lamp with a maximum output at 1.15μ emits about 10 to about 20 percent of it output above 5μ which can result in considerable absorption by polymers which have, for example, a carbonyl structure. Use of a quartz halogen lamp as the radiation source can reduce such absorption significantly since the halogen absorbs all output above about 5μ.

Although a wide variety of commercially available filters are available and can be used in the practice of this invention, the use of a sheet of plastic that is identical to the transmitting plastic is especially effective in the practice of this invention. Thus as shown in FIG. 1, plastic 22 has been found to be quite effective in reducing the surface temperature of an identical transmitting plastic 16. As an example, an acrylic plastic sheet 22 has been found to reduce the surface temperature of an identical transmitting plastic 16 by up to 45%. In a production setting, filter 22 may be cooled by air stream 28. Cooling may be further facilitated by forming filter 22 as a circular sheet and rotating a portion of the sheet with a suitable rotating drive such as motor 21.

In certain instances, the parts to be joined can contain areas that are especially sensitive to radiation from the radiation source. In such instances, a light barrier 62 such as a metal plate may be placed in the path of radiation 35 to mask portions of the plastic or substrate parts from radiation 35. Placement of the mask will depend to a considerable extent on the portion of the assembly to be protected and the orientation and focus of the electromagnetic radiation.

In FIGS. 1 and 2, the substrates 18 and 44, respectively, can be of any material capable of bonding with the transmitting plastic either directly or as a result of an additional bonding material and radiation absorbing material 42 placed in bond line 40. Preferably, and as shown in FIG. 1, substrate 18 is a plastic material that contains the absorbing material and is capable of fusing (intermixing) with transmitting plastic 16 as a result of both materials being in a molten state, for example a substrate 18 of black polycarbonate (filled with carbon black) and a transmitting plastic 16 of clear acrylic. As shown in FIG. 2, a suitable bonding material may be used in conjunction with the absorbing material 42, which, on heating, melts and adheres to both the transmitting plastic 16 and substrate 44 and bonds transmitting plastic 16 and substrate 44 on cooling.

In using certain materials for the transmitting plastic and substrate, bubbles may occur in the bond line and appear to be the result of gas generation. Such generation may result from flash dehydration, thermal reversion or polymer to gaseous monomer, or decomposition of various coatings on bond line surfaces. Several expedients may be used to remove such volatile components.

First, the various components forming the bond line, i.e., transmitting plastics, substrate, absorbing material and any additional bond materials can be dried at about 150° C. prior to the bonding procedure using electromagnetic radiation. Second, a two pass bonding method can be used in which the bond line is preheated using electromagnetic radiation followed by a second heating with electromagnetic radiation to achieve bonding temperatures. Third, additional pressure can be applied to the bond line to squeeze out any bubbles from the bond line. Such additional pressure may be applied with either the one pass or two pass bond line heating methods.

The following examples further illustrate the use of the present invention for the joining of a plastic material.

EXAMPLE I

Test samples were molded in the shape of American Welding Society (AWS) test T-samples. The T samples were 1.25 cm (½ inch) across, 1.25 cm (½ inch) deep and 5.1 cm (2 inches) long. Raw polymers of red, amber and clear acrylic well as black or gray polycarbonate were molded as T-samples. A fixture for use in sample welding is shown in FIG. 2 and designated generally as numeral 30. Two thin rods 46 serve as upper stops for radiation transmitting T-sample 16. Positioning bolts 48 are screwed through supports 52 and rest against the leg of light-transmitting plastic T-sample 16 to prevent it from sliding off of substrate 44 when melting occurs. Black or gray polycarbonate substrates 44 are held in a groove in plate 54 by means of a spring-loaded bar that engages the cross piece of the substrate T-sample 44 from the side (not shown). Pressure (arrow 56) is applied through aperture 58 which moves piston plate 54 upward to apply pressure to the bond line 40.

A Research Incorporated (Minneapolis, Minn.) 200 W quartz-halogen lamp (Model 4141) with a color temperature of about 3000° C. and peak radiation output at about 0.89μ was used in the configuration shown in FIGS. 1–2. The lamp delivered an energy flux of about 140 w/cm² at the focal point. The results for the bonding of a clear acrylic transmitting plastic T-sample 16 to a black polycarbonate substrate T-sample 18 as shown in FIG. 1 are given in Table I.

TABLE I

Bonding of Clear Acrylic Transmitting Plastic to a Black Polycarbonate Substrate

| Weld | Fail Load, N (lbf) | Speed cm/min (inch/min) | Pressure N/mm² (psig) | Comments |
|---|---|---|---|---|
| 1 | 756 (170) | 19 (7.5) | 0.02 (3) | Ambient |
| 2 | 2890 (650) | 19 (7.5) | 0.04 (6) | Ambient |
| 3 | 2839 (638) | 19 (7.5) | 0.034 (5) | Ambient |
| 4 | 2585 (581) | 35 (14) | 0.034 (5) | Ambient |
| 5 | 0 | 51 (20) | 0.02 (3) | Dry |
| 6 | 699 (157) | 35 (14) | 0.02 (3) | Dry |
| 7 | 934 (210) | 35 (14) | 0.023 (3.5) | Dry |
| 8 | 0 | 35 (14) | 0.027 (4) | Dry |
| 9 | 409 (92) | 51 (20) | 0.037 (5.5) | Dry |
| 10 | 494 (111) | 35 (14) | 0.034 (5) | Dry |
| 11 | 2024 (455) | 35 (14) | 0.037 (5.5) | Dry |
| 12 | 4231 (951) | 19 (7.5) | 0.04 (6) | Dry |
| 13 | 4320 (971) | 19 (7.5) | 0.02 (3) | Dry |
| 14 | 7142 (1605) | 35 (14) | 0.034 (5) | Dry, double pass |

EXAMPLE II

The apparatus configuration was the same as for Example I except an amber acrylic transmitting plastic was used in place of the clear plastic. Results are given in Table II.

TABLE II

Bonding of Amber Acrylic Transmitting Plastic to Black Polycarbonate Substrate

| Weld | Fail Load, N (lbf) | Speed cm/min (inch/min) | Pressure N/mm² (psig) | Comments |
|---|---|---|---|---|
| 15 | 2954 (664) | 19 (7.5) | 0.034 (5) | Ambient |
| 16 | 2349 (528) | 19 (7.5) | 0.034 (5) | Dry |
| 17 | 1014 (228) | 35 (14) | 0.02 (3) | Dry |
| 18 | 2149 (483) | 19 (7.5) | 0.023 (3.5) | Dry |
| 19 | 1005 (226) | 19 (7.5) | 0.027 (4) | Dry |

TABLE II-continued

Bonding of Amber Acrylic Transmitting Plastic to Black Polycarbonate Substrate

| Weld | Fail Load, N (lbf) | Speed cm/min (inch/min) | Pressure N/mm² (psig) | Comments |
|---|---|---|---|---|
| 20 | 828 (186) | 19 (7.5) | 0.030 (4.5) | Dry |
| 21 | 5095 (1145) | 19 (7.5) | 0.034 (5) | Dry |
| 22 | 2243 (504) | 19 (7.5) | 0.037 (5.5) | Dry |
| 23 | 650 (146) | 35 (14) | 0.04 (6) | Dry |
| 24 | 2176 (489) | 13 (5) | 0.02 (3) | Dry |
| 25 | 2082 (468) | 51 (20) | 0.034 (5) | Dry, double pass |

EXAMPLE III

The apparatus configuration was the same as for Example I except an red acrylic transmitting plastic was used in place of the clear plastic. Results are given in Table III.

TABLE III

Bonding of Red Acrylic Transmitting Plastic to Black Polycarbonate Substrate

| Weld | Fail Load, N (lbf) | Speed cm/min (inch/min) | Pressure N/mm² (psig) | Comments |
|---|---|---|---|---|
| 26 | 712 (160) | 19 (7.5) | 0.027 (4) | Ambient |
| 27 | 574 (129) | 35 (14) | 0.02 (3) | Dry |
| 28 | 574 (129) | 51 (20) | 0.023 (3.5) | Dry |
| 29 | 0 | 51 (20) | 0.027 (4) | Dry |
| 30 | 409 (92) | 35 (14) | 0.037 (5.5) | Dry |
| 31 | 0 | 51 (20) | 0.034 (5) | Dry |
| 32 | 0 | 51 (20) | 0.037 (5.5) | Dry |
| 33 | 173 (39) | 51 (20) | 0.04 (6) | Dry |
| 34 | 490 (110) | 51 (20) | 0.034 (5) | Dry, double pass |

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A method of plastic joining comprising:
   a) providing a radiation source of polychromatic, non-coherent electromagnetic radiation;
   b) providing an absorbing material that absorbs said polychromatic, non-coherent electromagnetic radiation with the generation of heat;
   c) providing a substantially rigid transmitting plastic that transmits said polychromatic, non-coherent electromagnetic radiation;
   d) providing a substrate;
   e) forming a bond line by placing said absorbing material in said bond line in proximity with said transmitting plastic and said substrate;
   f) filtering polychromatic, non-coherent electromagnetic radiation from said radiation source;
   g) directing said polychromatic, non-coherent electromagnetic radiation from said filtering step initially through said transmitting plastic and then to said absorbing material;
   h) absorbing said polychromatic non-coherent electromagnetic radiation with said absorbing material to produce sufficient heat in said bond line to afford intermixing of molten transmitting plastic and molten substrate; and
   i) cooling said bond line containing said absorbing material to bond said transmitting plastic and said substrate.

2. The method of plastic joining according to claim 1 comprising providing said absorbing material as part of said substrate.

3. The method of plastic joining according to claim 1 further comprising providing a bonding material in said bond line.

4. The method of plastic joining according to claim 1 comprising providing an infrared lamp as said radiation source of said polychromatic, non-coherent electromagnetic radiation.

5. The method of plastic joining according to claim 1 comprising providing a quartz halogen lamp as said radiation source of said polychromatic, non-coherent electromagnetic radiation.

6. The method of plastic joining according to claim 1 further comprising the step of forming a focused beam of said polychromatic, non-coherent electromagnetic radiation.

7. The method of plastic joining according to claim 1 further comprising the step of forming a parallel beam of said polychromatic, non-coherent electromagnetic radiation.

8. The method of plastic joining according to claim 1 further comprising the step of cooling said transmitting plastic while carrying out said step of directing said electromagnetic radiation through said transmitting plastic.

9. The method of plastic joining according to claim 8 comprising the step of directing a stream of air onto said transmitting plastic while carrying out said step of directing electromagnetic radiation through said transmitting plastic.

10. The method of plastic joining according to claim 1 further comprising the step of providing a plastic filter that is substantially of the same material as said transmitting plastic and filtering portions of said polychromatic, non-coherent electromagnetic radiation prior to passage of said radiation through said transmitting plastic.

11. The method of plastic joining according to claim 10 further comprising the step of cooling said plastic filter.

12. The method of plastic joining according to claim 1 further comprising the step of masking a portion of said substrate from said polychromatic, non-coherent electromagnetic radiation.

13. The method of plastic joining according to claim 1 further comprising the step of applying pressure to said bond line.

14. The method of plastic joining according to claim 1 further comprising moving said radiation source along said bond line.

15. The method of plastic joining according to claim 14 further comprising using a robot to move said radiation source along said bond line.

16. The method of plastic joining according to claim 1 comprising maintaining both said radiation source and said bond line in a static position while absorbing simultaneously said radiation with said absorbing material at all points along said bond line.

17. The method of plastic joining according to claim 1 further comprising an initial step of removing volatile components from at least one of said transmitting plastic, said absorbing material, and said substrate.

18. The method of plastic joining according to claim 1 further comprising drying at least one of said transmitting plastic, said absorbing material, and said substrate prior to said step of absorbing said radiation with said absorbing material.

19. The method of plastic joining according to claim 1 further comprising the step of preheating said bond line with said electromagnetic radiation.

20. A plastic manufacture joined according to the method of claim 1.

\* \* \* \* \*